US012405949B2

(12) United States Patent
Clemens et al.

(10) Patent No.: US 12,405,949 B2
(45) Date of Patent: Sep. 2, 2025

(54) GENERATING, ACCESSING, AND DISPLAYING LINEAGE METADATA

(71) Applicant: Ab Initio Technology LLC, Lexington, MA (US)

(72) Inventors: David Clemens, Cambridge, MA (US); Dusan Radivojevic, North Andover, MA (US); Neil Galarneau, West Roxbury, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/345,706

(22) Filed: Jun. 30, 2023

(65) Prior Publication Data

US 2024/0078229 A1 Mar. 7, 2024

Related U.S. Application Data

(63) Continuation of application No. 15/829,152, filed on Dec. 1, 2017, now Pat. No. 11,741,091.

(Continued)

(51) Int. Cl.
*G06F 16/245* (2019.01)
*G06F 16/22* (2019.01)
(Continued)

(52) U.S. Cl.
CPC ............ *G06F 16/245* (2019.01); *G06F 16/22* (2019.01); *G06F 16/248* (2019.01); *G06F 16/83* (2019.01); *G06F 40/117* (2020.01)

(58) Field of Classification Search
CPC ...... G06F 16/22; G06F 16/245; G06F 16/248; G06F 16/83; G06F 16/81; G06F 16/832; G06F 16/8365
See application file for complete search history.

(56) References Cited

U.S. PATENT DOCUMENTS 6,003,040 A 12/1999 Mital et al.
6,725,227 B1 4/2004 Li
(Continued)

FOREIGN PATENT DOCUMENTS

CN 101084496 12/2007
CN 101971165 2/2011
(Continued)

OTHER PUBLICATIONS

Alvarez et al., "A compact representation of graph databases," InProceedings of the Eighth Workshop on Mining and Learning with Graphs, Jul. 24, 2010, 18-25.
(Continued)

*Primary Examiner* — James E Richardson
(74) *Attorney, Agent, or Firm* — Fish & Richardson P.C.

(57) ABSTRACT

Among other things, we describe a method of receiving a portion of metadata from a data source, the portion of metadata describing nodes and edges; generating instances of a data structure representing the portion of metadata, at least one instance of the data structure including an identification value that identifies a corresponding node, one or more property values representing respective properties of the corresponding node, and one or more pointers to respective identification values, each pointer representing an edge associated with a node identified by the corresponding respective identification value; storing the instances of the data structure in random access memory; receiving a query that includes an identification of at least one particular element of data; and using at least one instance of the data structure to cause a display of a computer system to display a representation of lineage of the particular element of data.

21 Claims, 13 Drawing Sheets

Related U.S. Application Data

(60) Provisional application No. 62/428,860, filed on Dec. 1, 2016.

(51) Int. Cl.
   *G06F 16/248* (2019.01)
   *G06F 16/83* (2019.01)
   *G06F 40/117* (2020.01)

(56) References Cited

U.S. PATENT DOCUMENTS

| | | | |
|---|---|---|---|
| 7,401,064 B1 | 7/2008 | Arone | |
| 7,456,840 B2 | 11/2008 | Molesky et al. | |
| 7,493,570 B2 | 2/2009 | Bobbin | |
| 7,546,226 B1 | 6/2009 | Yeh et al. | |
| 7,590,672 B2 | 9/2009 | Slik et al. | |
| 7,725,433 B1 | 5/2010 | Labrie | |
| 7,844,582 B1 | 11/2010 | Arbilla et al. | |
| 7,970,240 B1 | 6/2011 | Chao et al. | |
| 8,266,122 B1 | 9/2012 | Newcombe et al. | |
| 8,332,782 B1 | 12/2012 | Chang et al. | |
| 8,515,911 B1* | 8/2013 | Zhou | G06F 16/1873 707/649 |
| 8,577,852 B2 | 11/2013 | Haahenson et al. | |
| 8,654,125 B2 | 2/2014 | Gibson | |
| 8,819,010 B2 | 8/2014 | Fankhauser | |
| 11,741,091 B2 | 8/2023 | Clemens et al. | |
| 2002/0030703 A1 | 3/2002 | Robertson et al. | |
| 2004/0181554 A1 | 9/2004 | Heckerman et al. | |
| 2004/0255239 A1 | 12/2004 | Bhatt | |
| 2005/0114369 A1 | 5/2005 | Gould et al. | |
| 2005/0246352 A1 | 11/2005 | Moore et al. | |
| 2006/0095466 A1 | 5/2006 | Stevens et al. | |
| 2006/0106847 A1 | 5/2006 | Eckardt et al. | |
| 2006/0149782 A1 | 7/2006 | Yeh et al. | |
| 2006/0190844 A1 | 8/2006 | Binder et al. | |
| 2006/0218159 A1 | 9/2006 | Murphy et al. | |
| 2006/0271505 A1 | 11/2006 | Vierich et al. | |
| 2006/0294150 A1 | 12/2006 | Stanfill et al. | |
| 2007/0016624 A1 | 1/2007 | Powers | |
| 2007/0033220 A1 | 2/2007 | Drucker et al. | |
| 2007/0061287 A1 | 3/2007 | Le et al. | |
| 2007/0061353 A1 | 3/2007 | Bobbin | |
| 2007/0112875 A1 | 5/2007 | Yagawa | |
| 2007/0150496 A1 | 6/2007 | Feinsmith | |
| 2007/0255741 A1 | 11/2007 | Geiger et al. | |
| 2008/0040388 A1* | 2/2008 | Petri | G06F 16/907 |
| 2008/0155119 A1 | 6/2008 | Imamura et al. | |
| 2008/0163124 A1 | 7/2008 | Bonev et al. | |
| 2008/0172629 A1 | 7/2008 | Tien et al. | |
| 2008/0183658 A1 | 7/2008 | Mangipudi | |
| 2008/0244721 A1* | 10/2008 | Barrus | G06F 21/6254 726/9 |
| 2009/0012983 A1 | 1/2009 | Senneville et al. | |
| 2009/0216728 A1 | 8/2009 | Brainerd et al. | |
| 2009/0224941 A1 | 9/2009 | Kansal et al. | |
| 2010/0138420 A1 | 6/2010 | Bator et al. | |
| 2010/0138431 A1 | 6/2010 | Bator et al. | |
| 2010/0223430 A1 | 9/2010 | Walker et al. | |
| 2010/0313157 A1 | 12/2010 | Carlsson | |
| 2011/0320460 A1 | 12/2011 | Fankhauser | |
| 2012/0059857 A1 | 3/2012 | Jackson, Jr. | |
| 2012/0143825 A1 | 6/2012 | Boehm et al. | |
| 2012/0209656 A1 | 8/2012 | Rojahn | |
| 2012/0254805 A1 | 10/2012 | Pic et al. | |
| 2012/0310875 A1 | 12/2012 | Prahlad et al. | |
| 2012/0311496 A1 | 12/2012 | Cao | |
| 2013/0332423 A1 | 12/2013 | Puri | |
| 2014/0019423 A1 | 1/2014 | Liensberger | |
| 2014/0114907 A1 | 4/2014 | Kozina | |
| 2014/0244687 A1 | 8/2014 | Shmueli et al. | |
| 2014/0279979 A1 | 9/2014 | Yost et al. | |
| 2015/0012478 A1 | 1/2015 | Mohammad et al. | |
| 2015/0142724 A1 | 5/2015 | Nair | |
| 2015/0271267 A1* | 9/2015 | Solis | G06F 16/178 709/213 |
| 2016/0019057 A1 | 1/2016 | Bach et al. | |
| 2016/0063106 A1 | 3/2016 | Chai | |
| 2016/0232229 A1 | 8/2016 | Radivojevic | |
| 2016/0232230 A1 | 8/2016 | Radivojevic | |
| 2017/0058320 A1 | 3/2017 | Locke et al. | |
| 2017/0154087 A1* | 6/2017 | McClure | G06Q 10/0633 |
| 2017/0286526 A1 | 10/2017 | Bar-Or et al. | |
| 2018/0157702 A1 | 6/2018 | Clemens et al. | |

FOREIGN PATENT DOCUMENTS

| | | |
|---|---|---|
| CN | 102239458 | 11/2011 |
| CN | 102890720 | 1/2013 |
| EP | 1258814 | 11/2002 |
| EP | 1510937 | 3/2005 |
| JP | H08-033895 | 2/1996 |
| JP | H11-307412 | 11/1999 |
| JP | 2002288403 | 10/2002 |
| JP | 2003044538 | 2/2003 |
| JP | 2005122703 | 5/2005 |
| JP | 2006-190261 | 7/2006 |
| JP | 2008059563 | 3/2008 |
| JP | 2008134705 | 6/2008 |
| JP | 2008524671 | 7/2008 |
| JP | 2010244157 | 10/2010 |
| JP | 2011517352 | 6/2011 |
| JP | 2013-077063 A | 4/2013 |
| JP | 2015-531129 A | 10/2015 |
| JP | 2016520890 | 7/2016 |
| WO | WO 2001082068 | 11/2001 |
| WO | WO 2001082072 | 11/2001 |
| WO | WO 2005086906 | 9/2005 |
| WO | WO 2007002647 | 1/2007 |
| WO | WO 2010065623 | 6/2010 |
| WO | WO 2015183738 | 12/2015 |
| WO | WO 2016014615 | 1/2016 |

OTHER PUBLICATIONS

Alvarez-Garcia et al., "Compact and efficient representation of general graph databases," Knowledge and Information Systems., Sep. 1, 60(3):1479-510.

Australian Office Action in 2009-322441, issued Dec. 16, 2015, 4 pages.

Chinese Office Action, Application No. 200980148414.6, mailed May 10, 2013, 15 pages (with English translation).

DePauw, W., et al., "Web Services Navigator: Visualizing the Execution of Web Services." IBM Systems Journal, vol. 44, No. 4, 2005, pp. 821-845.

Hiroto Namihara, "Learning Data Structures and Algorithm in C language," Interface, Japan, CQ Publishing Co., Ltd., Apr. 1, 1990, vol. 16, No. 4, pp. 158-181.

International Preliminary Report on Patentability in PCT Appln. No. PCT/US2017/064227, dated Jun. 4, 2019, 14 pages.

International Preliminary Report on Patentability, PCT/US2013/062369, Apr. 9, 2015, 7 pages.

International Search Report & Written Opinion issued in PCT application No. PCT/US09/66390, dated Jan. 20, 2010, 6 pages.

International Search Report & Written Opinion issued in PCT application No. PCT/US09/66394, dated Jan. 20, 2010, 6 pages.

International Search Report & Written Opinion, PCT/US2013/062369, Feb. 28, 2014, 9 pages.

International Search Report & Written Opinion, PCT/US2013/076407, Jun. 18, 2014, 8 pages.

International Search Report and Written Opinion in PCT/US14/26133, Aug. 21, 2014, 8 pages.

Japanese Office Action (with English translation), Application No. 2011-514796, mailed Jun. 20, 2013, 9 pages.

Japanese Office Action (with English translation), Application No. 2011-539651, mailed Oct. 11, 2013, 4 pages.

Japanese Office Action (with English translation), Application No. 2011-539652, mailed Dec. 16, 2013, 8 pages.

(56) References Cited

OTHER PUBLICATIONS

Japanese Office Action (with English translation), Application No. 2011-539652, mailed Nov. 14, 2014, 7 pages.
Japanese Office Action (with English translation), Application No. 2014-232962, mailed Nov. 13, 2015, 8 pages.
JP Office Action in Japanese Appln. No. 2019-525760, dated Aug. 28, 2020, 7 pages (with English translation).
Karr, et al., "Data quality: A Statistical Perspective," Statistical Methodology 3 2006, pp. 137-173.
Korean Office Action in Application No. 10-2011-7013820, mailed Oct. 21, 2015, 14 pages.
Korean Office Action in Application No. 10-2011-7014656, mailed Oct. 21, 2015, 14 pages.
Nelson, Theodor Holm, "A Cosmology for a Different Computer Universe: Data Model, Mechanisms, Virtual Machine and Visualization Infrastructure," Journal of Digital Information, vol. 5, No. 1, 22 pages (2004).
Office Action in Chinese Appln. No. 201780074708.3, dated Jan. 5, 2023, 15 pages (with English translation).
Office Action in Chinese Appln. No. 201780074708.3, mailed on Nov. 15, 2023, 23 pages (with Machine translation).
Office Action in European Appln. No. 17851913.8, dated Jun. 14, 2022, 29 pages.
Office Action in Japanese Appln. No. 2019-525760, dated Jul. 26, 2021, 9 pages (with English translation).
Office Action in Japanese Appln. No. 2019-525760, dated Jun. 1, 2022, 22 pages (with English translation).
Office Action in Japanese Appln. No. 2021-191498, dated Feb. 8, 2023, 15 pages (with English translation).
Office Action in Singapore Appln. No. 11201903995V, dated Jun. 23, 2022, 8 pages.
Parker et al., Visualization of Large Nested Graphs in 3D: Navigation and Interaction, University of New Brunswick, Jul. 18, 2000 http://com.unh.edu/vislab/PDFs/visualnav.pdf.
Robertson et al., "Polyarchy Visualization: Visualizing Multiple Intersecting Hierarchies," Computer Human Interaction—CHI , pp. 423-430, 2002.
Robertson, George G. "From Hierarchies to Polyarchies: Visualizing Multiple Relationships," Advanced Visual Interfaces Jan. 2000.
SG Office Action in Singapore Appln. No. 11201903995V, dated Oct. 13, 2020, 7 pages.
Supplementary European Search Report in EP14768183 mailed Oct. 4, 2016 (5 pages).
Supplementary European Search Report, EP 09767701, Sep. 25, 2012, 7 pages.
Supplementary European Search Report, EP 09831039, May 15, 2012, 9 pages.
Supplementary European Search Report, EP 09831042, May 4, 2012, 8 pages.
Takahashi, Kenji, "An Analysis of Requirements Elicitation Process," IEICE Technical Report, Institute of Electronics, Information and Communication Engineers, vol. 92, No. 128, 47-54 (1992) (with English translation).
Notification of Transmittal of The International Search Report and the Written Opinion of the International Searching Authority, or the Declaration, for Application No. PCT/US09/47735, dated Jul. 23, 2009, 6 pages.
Zamboulis et al. "XML Data Integration by Graph Restructuring," British National Conference on Databases, Jul. 7, 2004, pp. 57-71.
Office Action in European Appln. No. 17851913.8, mailed Jun. 18, 2024, 18 pages.
Decision of Technical Board of Appeal in European Appln. No. 17851913.8, mailed on Jan. 3, 2025, 25 pages.
Notification of Grant in Singaporean Appln. No. 11201903995V, mailed on Jan. 7, 2025, 3 pages.
Office Action in Japanese Appln No. 2023-216403, mailed on Dec. 11, 2024, 8 pages (with English translation).

\* cited by examiner

GENERATING, ACCESSING, AND DISPLAYING LINEAGE METADATA

CLAIM OF PRIORITY

This application is a continuation application of U.S. patent application Ser. No. 15/829,152, filed on Dec. 1, 2017, which claims priority under 35 U.S.C. § 119 (e) to U.S. Patent Application Ser. No. 62/428,860, filed on Dec. 1, 2016, the entire contents of which are hereby incorporated by reference.

TECHNICAL FIELD

This application relates to data structures and methods for generating, accessing, and displaying lineage metadata, e.g. lineage of an element of data stored in a data storage system.

BACKGROUND

Enterprises use data processing systems, such as data warehousing, customer relationship management, and data mining, to manage data. In many data processing systems, data are pulled from many different data sources, such as database files, operational systems, flat files, the Internet, and other sources into a central repository. Often, data are transformed before being loaded in the data system. Transformation may include cleansing, integration, and extraction. To keep track of data, its sources, and the transformations that have happened to the data stored in a data system, metadata can be used. Metadata (sometimes called "data about data") are data that describe other data's attributes, format, origins, histories, inter-relationships, etc. Metadata management can play a central role in complex data processing systems.

Sometimes a user may want to investigate how certain data are derived from different data sources. For example, a user may want to know how a dataset or data object was generated or from which source a dataset or data object was imported. Tracing a dataset back to sources from which it is derived is called data lineage tracing (or "upstream data lineage tracing"). Sometimes a user may want to investigate how certain datasets have been used (called "downstream data lineage tracing" or "impact analysis"), for example, which application has read a given dataset. A user may also be interested in knowing how a dataset is related to other datasets. For example, a user may want to know if a dataset is modified, what tables will be affected.

Lineage, which is a kind of metadata, enables a user to obtain answers to questions about data lineage (e.g., "Where did a given value come from?" "How was the output value computed?" "Which applications produce and depend on this data?"). A user can understand the consequences of proposed modifications (e.g., "If this piece changes, what else will be affected?" "If this source format changes, which applications will be affected?"). A user can also obtain questions to answers involving both technical metadata and business metadata (e.g., "Which groups are responsible for producing and using this data?" "Who changed this application last?" "What changes did they make?").

The answers to these questions can assist in analyzing and troubleshooting complex data processing systems. For example, if an element of data has an unexpected value, any number of prior inputs or data processing steps might be responsible for this unexpected value. Accordingly, lineage is sometimes presented to a user in the form of a diagram that includes a visual element representing an element of data of interest, as well as visual elements representing other elements of data that affect or are affected by the element of data of interest. A user can view this diagram and visually identify other elements of data and/or transformations that affect the element of data of interest. As an example, by using this information, the user can see whether any of the elements of data and/or transformations may be a source of unexpected values, and correct (or flag for correction) any of the underlying data processing steps if problems are discovered. As another example, by using this information, the user can identify any elements of data or transformations that may be essential to a portion of the system (e.g., such that the element of data of interest would be affected by their removal from the system), and/or elements of data or transformations that may not be essential to a portion of the system (e.g., such that the element of data of interest would not be affected by their removal from the system).

SUMMARY

Among other things, we describe a method performed by a data processing apparatus, the method including receiving a portion of metadata from a data source, the portion of metadata describing nodes and edges, at least some of the edges each representing an effect of one node upon another node, each edge having a single direction; generating instances of a data structure representing the portion of metadata, at least one instance of the data structure including an identification value that identifies a corresponding node, one or more property values representing respective properties of the corresponding node, and one or more pointers to respective identification values, each pointer representing an edge associated with a node identified by the corresponding respective identification value; storing the instances of the data structure in random access memory; receiving a query that includes an identification of at least one particular element of data; and using at least one instance of the data structure to cause a display of a computer system to display a representation of lineage of the particular element of data.

These techniques can be implemented in a number of ways, including as a method, system, and/or computer program product stored on a computer readable storage device.

Aspects of these techniques can include one or more of the following advantages. Lineage metadata can be stored using a special-purpose data structure designed for speed and efficiency when responding to queries for lineage metadata. Lineage metadata can be stored in memory, such that a computer system storing the lineage metadata can respond to queries for lineage metadata more quickly than if the lineage metadata were not stored in memory (e.g., if the lineage metadata were stored in and accessed from a hard disk or another kind of storage technique). Using the techniques described herein, lineage data can be retrieved much faster than other techniques, e.g., 500 times faster.

DESCRIPTION OF DRAWINGS

Like reference symbols in the various drawings indicate like elements.

DESCRIPTION

A system that manages access to metadata can receive a query from a user requesting lineage of a particular element of data and, in response, deliver a diagram representing lineage of the element of data. If the element of data belongs to a data storage system that stores a relatively large amount of data, the system that manages access to the metadata may need to expend a large amount of processing time in order to process the lineage of the element of data and generate the corresponding diagram. However, the processing can be sped up and made more efficient by introducing a system that is dedicated to processing lineage metadata and optimized for this kind of processing. Accordingly, this specification describes a technique by which a specialized system is used for the purpose of processing and storing lineage metadata in a manner that is typically faster and more efficient than if the specialized system were not used.

Figure 1A:
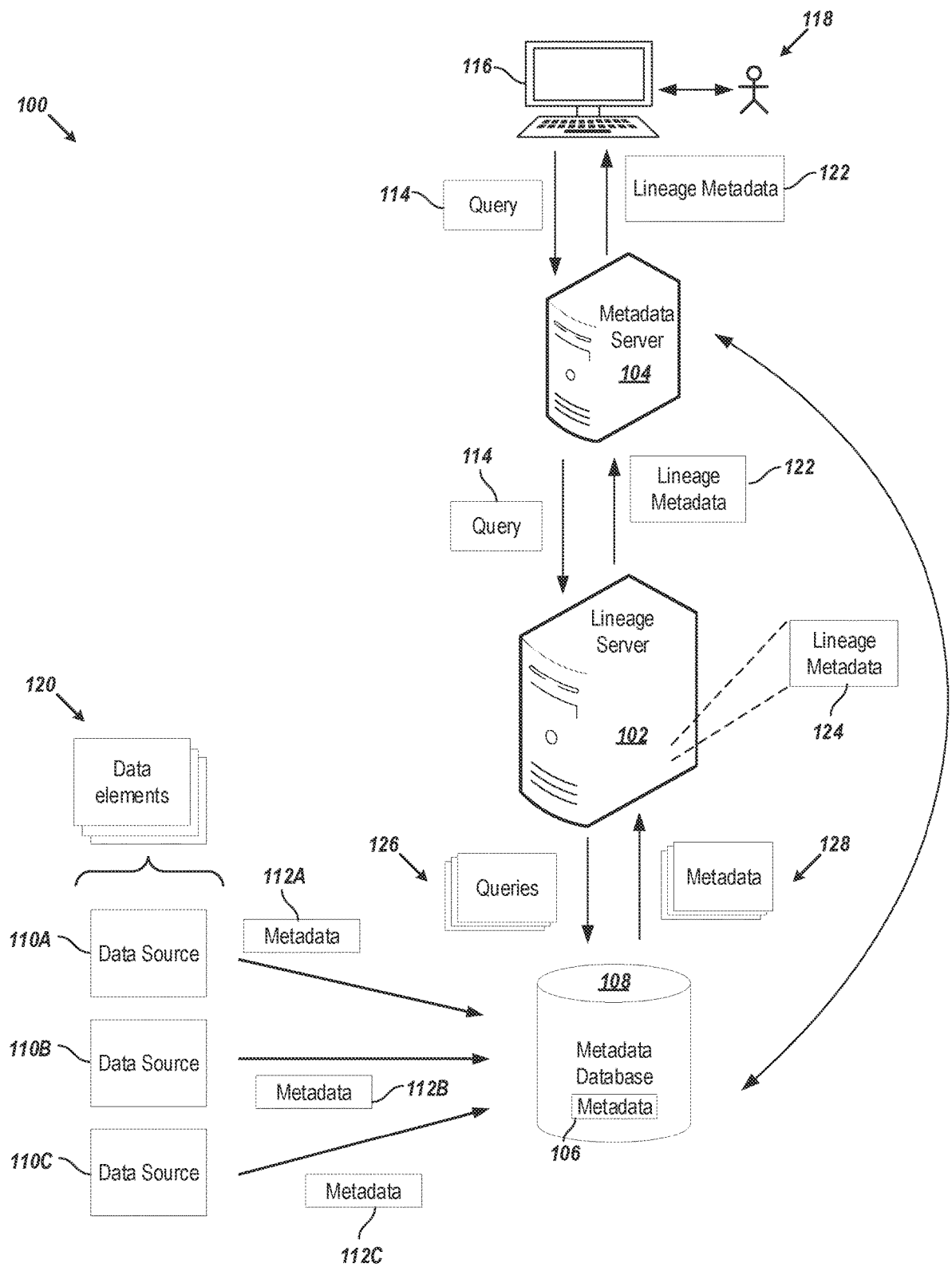
FIGS. 1A-1D show a metadata processing environment.

FIG. 1A shows a metadata processing environment 100 that includes a lineage server 102 which stores and provides lineage metadata to other systems in the environment. The metadata processing environment 100 also includes a metadata server 104 which typically responds to requests for metadata. The metadata server 104 has access to metadata 106 stored in a metadata database 108. The metadata 106 comes from data sources 110A-C which contribute metadata 112A-C to the metadata database 108 on an ongoing basis. For example, the data sources 110A-C may be any combination of relational databases, flat files, network sources, and so on.

In use, the metadata server 104 responds to a query 114 received from a user terminal 116 operated by a user 118. For example, the user terminal 116 could be a computing device such as a personal computer, laptop computer, tablet device, smartphone, etc. In some examples, the user terminal 116 operates a network-based user application such as a web browser, e.g., if the metadata server 104 is configured to provide access to data over a network and includes, or communicates with, a web server that can interface with the web browser. In general, many of the interactions between computer systems described herein may take place using the Internet or a similar communications network using communications protocols commonly used on these kinds of networks.

The metadata server 104 is configured to respond to queries for multiple kinds of metadata. Because one kind of metadata is lineage metadata, the metadata server 104 can process a query 114 that requests lineage of a particular element of data, e.g., an element of data 120 stored by one of the data sources 110A-C, by accessing metadata 106 stored in the metadata database 108 describing the lineage of the particular element of data. The metadata server 104 can then provide lineage metadata 122 to the user terminal 116, e.g., lineage metadata in the form of a lineage diagram (described below with respect to FIGS. 2A-2E).

In some examples, processing a query 114 related to lineage metadata is a task that takes a relatively large amount of processing time and/or uses a relatively large amount of processing resources of the metadata server 104. For example, in order to process the query 114, the metadata server 104 may need to access metadata 106 stored in the metadata database 108. In this example, the metadata server 104 would need to spend processing resources generating queries to the metadata database 108 in order to access all of the required metadata. Further, the process of transmitting a query to the metadata database 108 and waiting for a response introduces latency, e.g., communications network latency. Additionally, in some examples, the metadata server 104 would need to process the metadata received from the metadata database 108 in order to extract metadata needed to create a lineage diagram. For example, the metadata received from the metadata database 108 may include information not directly pertinent to lineage of an element of data of interest, since the metadata database 108 stores a variety of kinds of metadata beyond lineage metadata, and so additional processing time is used to identify and remove the information not pertinent to lineage.

In some implementations, the lineage server 102 is used to provide lineage metadata to the metadata server 104, e.g., to improve performance of the metadata processing environment 100. The lineage server 102 is a specialized system that stores lineage metadata 124 in a form that can be typically accessed faster and more efficiently than techniques that do not use a lineage server. In particular, the lineage server 102 stores lineage metadata 124 using a special-purpose data structure designed for speed and efficiency when responding to queries for lineage metadata. A data structure defines an arrangement of data, such that all data stored using a particular data structure is arranged in the same manner. The data structure technique is described in further detail below with respect to FIG. 3.

In use, the lineage server 102 transmits queries 126 to the metadata database 108 in order to retrieve lineage metadata 128. The lineage server 102 ideally stores a comprehensive body of lineage metadata, e.g., for most or all of the data elements 120 stored by the data sources 110A-C. In this way, the lineage server 102 can respond to queries for lineage for most of the data elements 120 for which a query might be made. As the lineage server 102 receives lineage metadata 128 from the metadata database 108, the lineage server 102 updates its data structures containing stored lineage metadata 124. In some examples, the lineage server 102 sends new queries 126 to the metadata database 108 on regular intervals, e.g., every hour or every day or another interval, in order to store a relatively up-to-date body of lineage metadata. For example, the intervals can be scheduled intervals, e.g., corresponding to schedule data maintained by the lineage server 102.

Figure 1B:
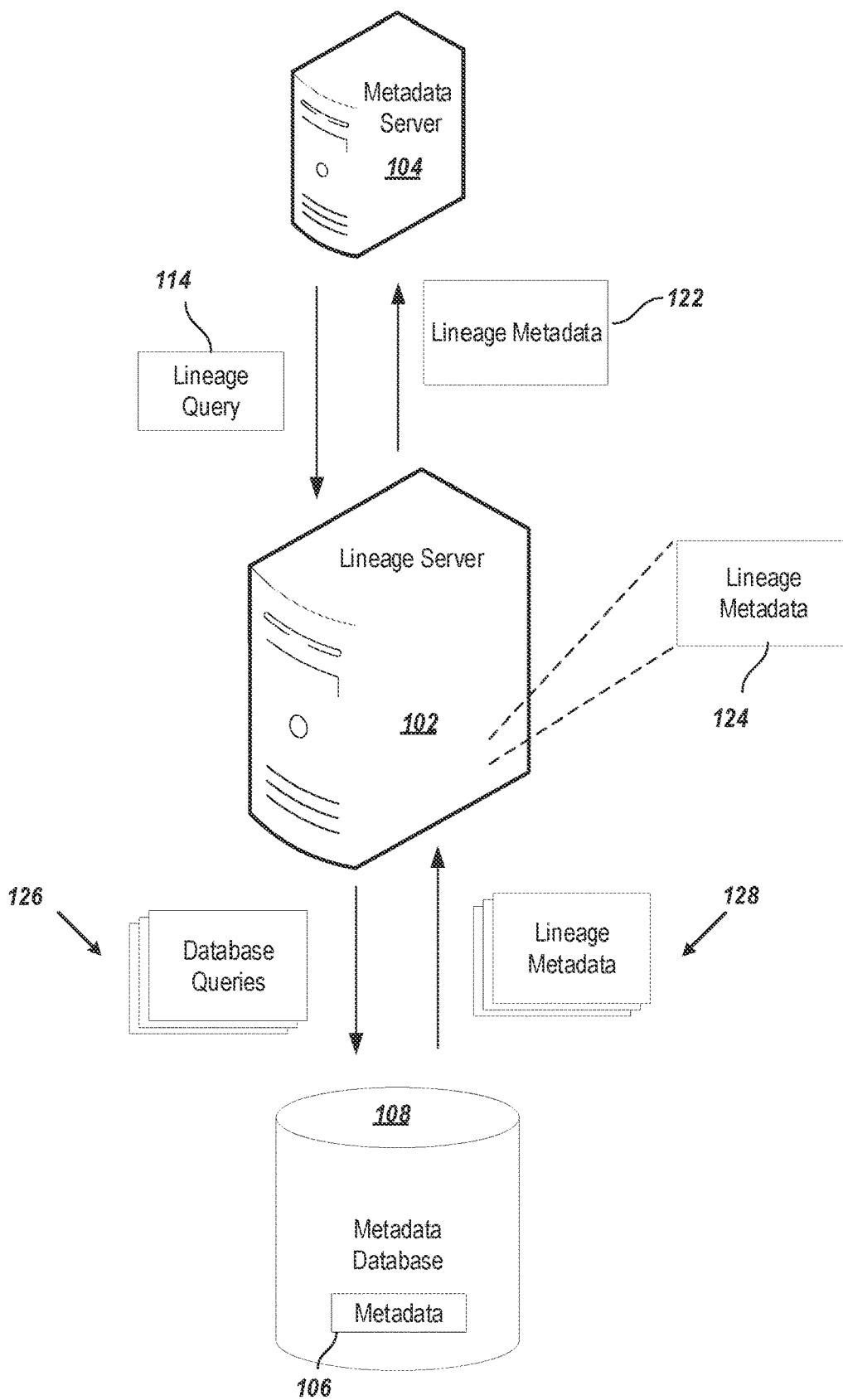

As shown in greater detail in FIG. 1B, the metadata server 104 receives a query 114 for lineage metadata (e.g., a query for lineage metadata that can be used to display a lineage diagram on the user terminal 116), the metadata server 104 can provide the query 114 to the lineage server 102. The lineage server can then return lineage metadata 122 responsive to the query 114. The metadata server 104 need not expend as much processing time and use as many processing resources preparing the received lineage metadata 122 before providing it to the user terminal 116, compared to lineage metadata retrieved using other techniques such as retrieving the lineage metadata from the metadata database 108.

Figure 1C:
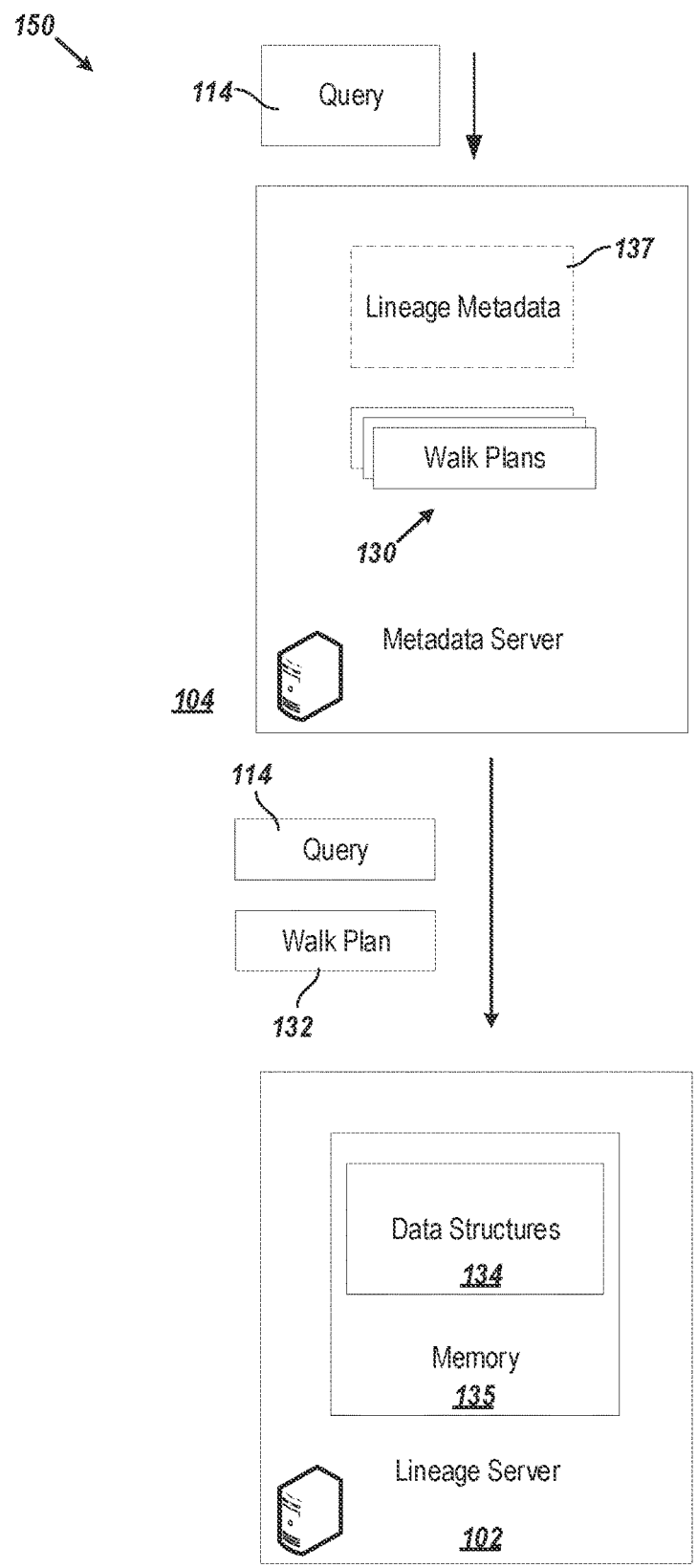
Figure 1D:
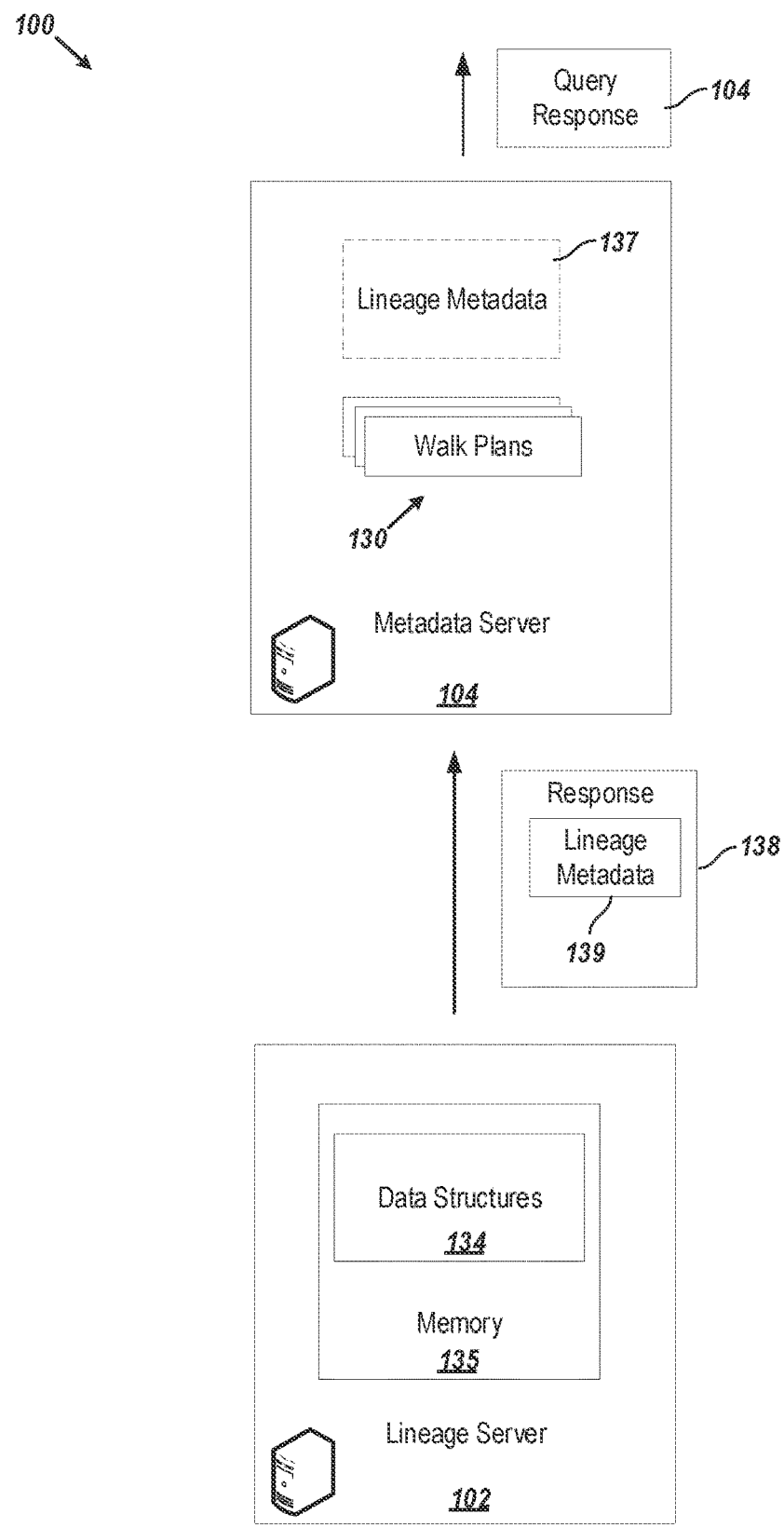

FIGS. 1C and 1D show elements of the lineage server 102 and metadata server 104 and the way in which they interact. As described above, the metadata server 104 receives a query 114 that requests lineage of a particular element of data. The query 114 identifies the particular data element (e.g., one of the data elements 120 of FIG. 1A) for which lineage is requested. The metadata server 104 uses the identity of the data element to select a walk plan 130 from a set of walk plans 132 that can be used to gather lineage metadata related to the data element. A walk plan 130 is a data structure (e.g., a structured document containing tagged portions, such as an XML document) which describes how to traverse ("walk") a set of lineage metadata in a particular manner. In some examples, a walk plan can be selected based on a data type of the data element. For example, a particular data type can be associated with a particular one of the walk plans 132 (e.g., an association stored in an index of associations accessible to the metadata server 104). The walk plans 132 are described in detail below with respect to FIG. 4.

Once a walk plan 130 has been selected, the metadata server 104 transmits the query 114 and the walk plan 130 to the lineage server 102. In response, the lineage server 102 identifies lineage metadata relevant to the query 114 among its data structures 134 of lineage metadata. The data structures 134 are a representation of lineage metadata arranged in a way that minimizes the amount of storage space needed to contain them, without omitting any data that is needed to respond to a query for lineage metadata. Thus, the lineage server 102 can typically use the data stored in its data structures 134 to provide the metadata server 104 all of the lineage metadata that the metadata server 104 would need to respond to a query 114. The data structures 134 are described in detail below with respect to FIG. 3.

In some implementations, the data structures 134 are loaded in memory 135 of the lineage server 102 for fast access (e.g., fast reading and writing of data). One example of memory is random access memory. Random access memory stores items of data in a manner such that each item of data can be accessed in substantially the same amount of time as any other item of the same size (e.g., a byte or a word). In contrast, other types of data storage, such as magnetic disks, have physical constraints that cause some items of data to take longer to access than other elements of data, depending on the current physical state of the disk (e.g., the position of a magnetic read/write head). Items of data stored in random access memory are typically stored at an address unique to that item of data or shared among a small number of items of data. Random access memory is typically volatile, such that data stored in random is lost if the random access memory is disconnected from an active power source (e.g., a computer system loses power). In contrast, magnetic disks and some other kinds of data storage is non-volatile and retains data absent an active power source.

Because the lineage server 102 stores the data structures 134 in memory 135, the lineage server 102 can read and write lineage metadata faster than techniques that do not store the data structures in memory 135. In particular, the data structures 134 are arranged in a way that minimizes the amount of data use. For example, the data structures 134 may omit data such as text strings present in the original lineage metadata obtained from the metadata server 104. Thus, all of the data structures 134, e.g., all of the data representing lineage metadata, can be stored in memory 135 while the lineage server 102 is in use. Computer systems typically have constraints on the amount of random access memory that can be used at a given time (e.g., due to addressing limitations). Further, random access memory tends to be more expensive on a per-byte basis than other types of data storage (e.g., magnetic disk). Thus, if random access memory is used, the data structures 134 may have an upper limit to their combined size on a particular computer system. Accordingly, the techniques described herein (e.g., the techniques described below with respect to FIG. 3) minimize their size but retain information with respect to lineage that may be requested by a query 114.

In some implementations, the metadata server 104 also stores lineage metadata 137 (e.g., lineage metadata received from the metadata database 108 shown in FIG. 1A). However, the metadata server 104 does not store most of its stored lineage metadata 137 in random access memory, e.g., because the metadata server 104 does not use the data structures of the lineage server 102. Thus, even if the metadata server 104 also stores some lineage metadata 137, the metadata server 104 can access the lineage metadata 124 of the lineage server 102 to obtain any metadata not stored locally at the metadata server 104. If the lineage server 102 were not used, a metadata server 104 storing some lineage metadata 137 typically would access lineage metadata stored in the metadata database 108 (FIG. 1A), which, as described above, may have performance disadvantages compared to using the lineage server 102.

Although random access memory is used here as the primary example, other types of memory can be used with the lineage server 102. For example, another kind of memory is flash memory. Unlike random access memory, flash memory is non-volatile. However, flash memory typically has constraints on accessing items of data. Some types of flash memory are configured in a way that a collection of data items (e.g., blocks of data items) is the smallest unit of data that can be accessed at a time, as opposed to individually accessible data items. For example, in order to delete an item of data on some types of flash memory, an entire block must be deleted. The remaining items of data can be re-written to the flash memory to preserve them.

The lineage server 102 uses the walk plan 130 to traverse the data structures 134 and collect lineage metadata stored in the data structures that is responsive to the query 114. As shown in FIG. 1D, the lineage server 102 then sends a response 138 containing the lineage metadata 139 back to the metadata server 104. The metadata server 104 can use the lineage metadata 139 to generate its own response 140 to the query 114. The response 140 could take one of several forms. In some examples, the response 140 contains the same lineage metadata 139 received from the lineage server 102, e.g., in a form with minimal post-processing. In some examples, the metadata server 104 performs post-processing on the lineage metadata 139. For example, the metadata server 104 may change the form of the lineage metadata 139 to a human-readable form, e.g., if the lineage metadata 139 is received in an encoded format that is not human-readable. In some examples, the metadata server 104 generates a lineage diagram based on the lineage metadata 139 and incorporates data representing the lineage diagram into the response 140. In some examples, the response 140 is transmitted to the user terminal 116 (FIG. 1A), e.g., if the response 140 is a lineage diagram (as described in detail below with respect to FIGS. 2A-2E). In some examples, the response 140 is transmitted to an intermediate system before it is transmitted to the user terminal and/or processed into a form suitable for transmission to the user terminal.

Figure 2A:
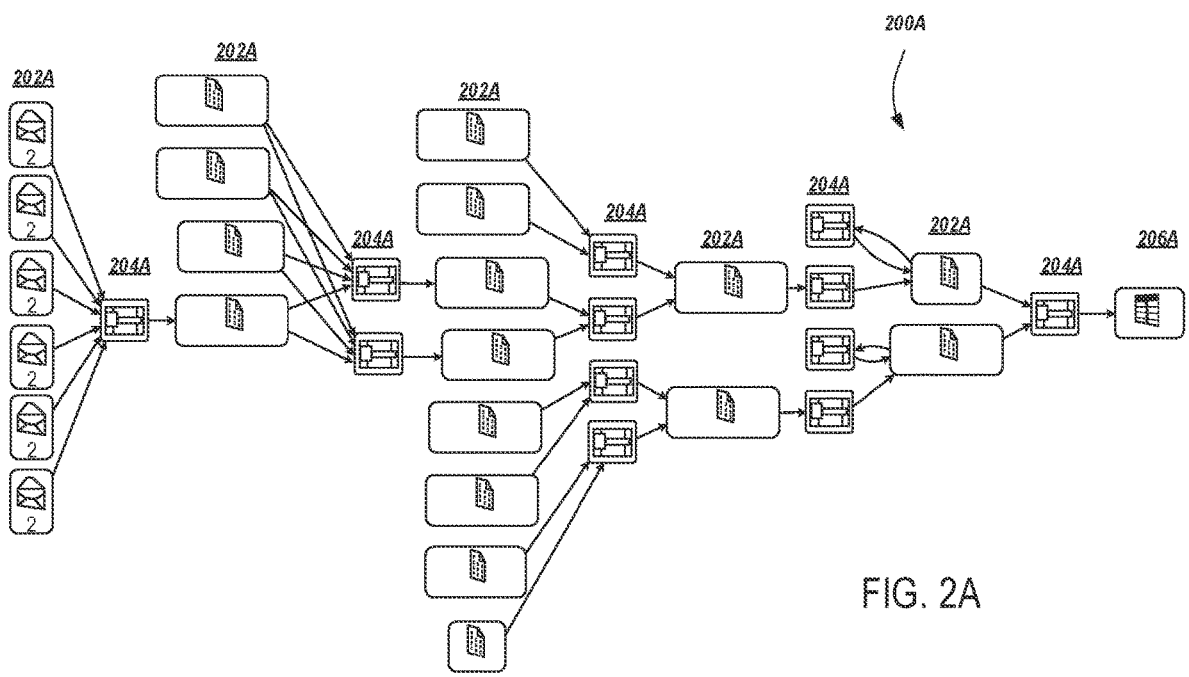
FIGS. 2A-2E show examples of information displayed in a metadata viewing environment.

FIG. 2A shows an example of information displayed in a metadata viewing environment. In some examples, the metadata viewing environment is an interface that executes on a user terminal, e.g., the user terminal 116 shown in FIG. 1A. In the example of FIG. 2A, the metadata viewing environment displays information related to a data lineage diagram 200A. One example of metadata viewing environment is a web-based application that allows a user (e.g., the user 118 shown in FIG. 1A) to visualize and edit metadata. Using the metadata viewing environment, a user can explore, analyze, and manage metadata using a standard Web browser from anywhere within an enterprise. Each type of metadata object has one or more views or visual representations. The metadata viewing environment of FIG. 2A illustrates a lineage diagram for target element 206A.

For example, the lineage diagram displays the end-to-end lineage for the data and/or processing nodes that represent the metadata objects stored in the metadata server 104 (FIG. 1A); that is, the objects a given starting object depends on (its sources) and the objects that a given starting object affects (its targets). In this example, connections are shown between data elements 202A and transformations 204A, two examples of metadata objects. The metadata objects are represented by nodes in the diagram. Data elements 202A can represent datasets, tables within datasets, columns in tables, and fields in files, messages, and reports, for example. An example of a transformation 204A is an element of an executable that describes how a single output of a data element is produced. The connections between the nodes are based on relationships among the metadata objects.

Figure 2B:
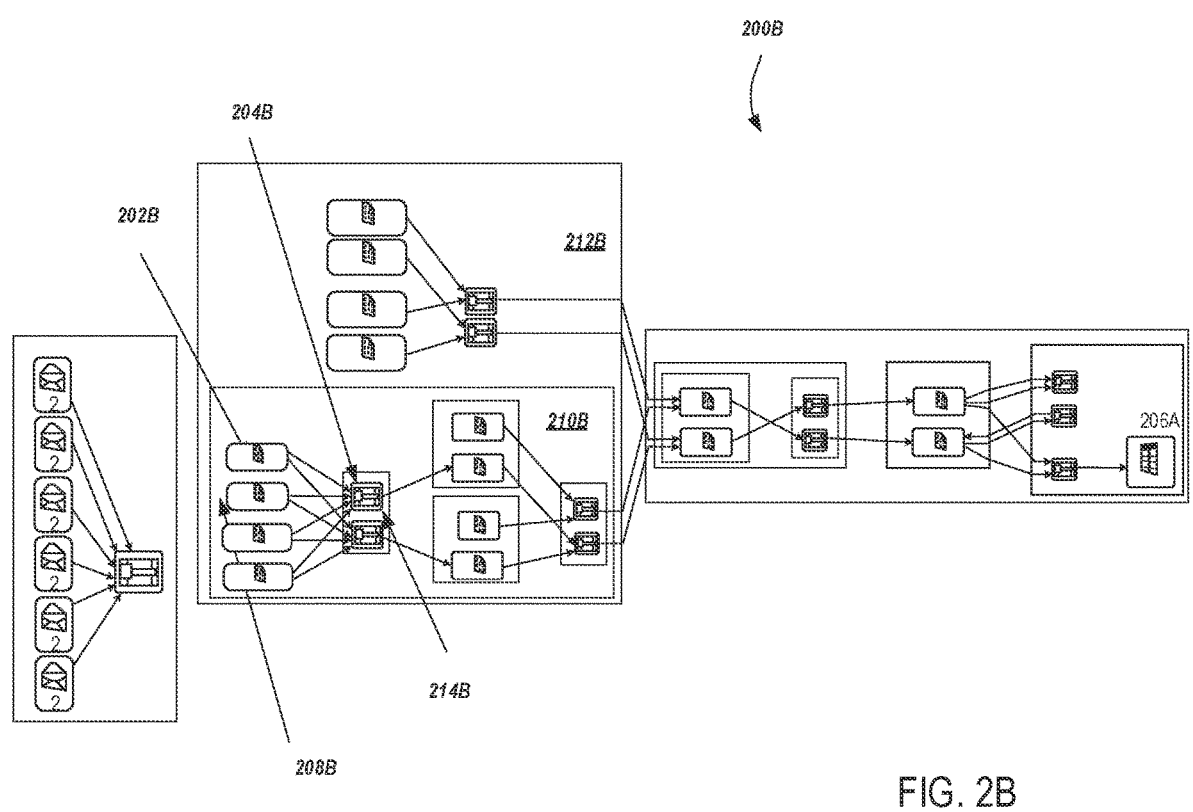

FIG. 2B is illustrates a corresponding lineage diagram 200B for the same target element 206A shown in FIG. 2A except each element 202B is grouped and shown in a group based on a context. For example, data elements 202B are grouped in datasets 208B (e.g., tables, files, messages, and reports), applications 210B (that contain executables such as graphs and plans and programs, plus the datasets that they operate on), and systems 212B. Systems 212B are functional groupings of data and the applications that process the data; systems consist of applications and data groups (e.g., databases, file groups, messaging systems, and groups of datasets). Transformations 204B are grouped in executables 214B, applications 210B, and systems 212B. Executables such as graphs, plans or programs, read and write datasets. Parameters can set what groups are expanded and what groups are collapsed by default. This allows users to see the details for only the groups that are important to them by removing unnecessary levels of details.

Using the metadata viewing environment to perform data lineage calculations is useful for a number of reasons. For example, calculating and illustrating relationships between data elements and transformations can help a user determine how a reported value was computed for a given field report. A user may also view which datasets store a particular type of data, and which executables read and write to that dataset. In the case of business terms, the data lineage diagram may illustrate which data elements (e.g., columns and fields) are associated with certain business terms (e.g., definitions in an enterprise).

Data lineage diagrams shown within the metadata viewing environment can also aid a user in impact analysis. Specifically, a user may want to know which downstream executables are affected if a column or field is added to a dataset, and who needs to be notified. Impact analysis may determine where a given data element is used, and can also determine the ramifications of changing that data element. Similarly, a user may view what datasets are affected by a change in an executable, or whether it safe to remove a certain database table from production.

Using the metadata viewing environment to perform data lineage calculations for generating data lineage diagrams is useful for business term management. For instance, it is often desirable for employees within an enterprise to agree on the meanings of business terms across that enterprise, the relationships between those terms, and the data to which the terms refer. The consistent use of business terms may enhance the transparency of enterprise data and facilitates communication of business requirements. Thus, it is important to know where the physical data underlying a business term can be found, and what business logic is used in computations.

Viewing relationships between data nodes can also be helpful in managing and maintaining metadata. For instance, a user may wish to know who changed a piece of metadata, what the source (or "source of record") is for a piece of metadata, or what changes were made when loading or reloading metadata from an external source. In maintaining metadata, it may be desirable to allow designated users to be able to create metadata objects (such as business terms), edit properties of metadata objects (such as descriptions and relationships of objects to other objects), or delete obsolete metadata objects.

The metadata viewing environment provides a number of graphical views of objects, allowing a user to explore and analyze metadata. For example, a user may view the contents of systems and applications and explore the details of any object, and can also view relationships between objects using the data lineage views, which allows a user to easily perform various types of dependency analysis such as the data lineage analysis and impact analysis described above. Hierarchies of objects can also be viewed, and the hierarchies can be searched for specific objects. Once the object is found bookmarks can be created for objects allowing a user to easily return to them.

With the proper permissions, a user can edit the metadata in the metadata viewing environment. For example, a user can update descriptions of objects, create business terms, define relationships between objects (such as linking a business term to a field in a report or column in a table), move objects (for instance, moving a dataset from one application to another) or delete objects.

Figure 2C:
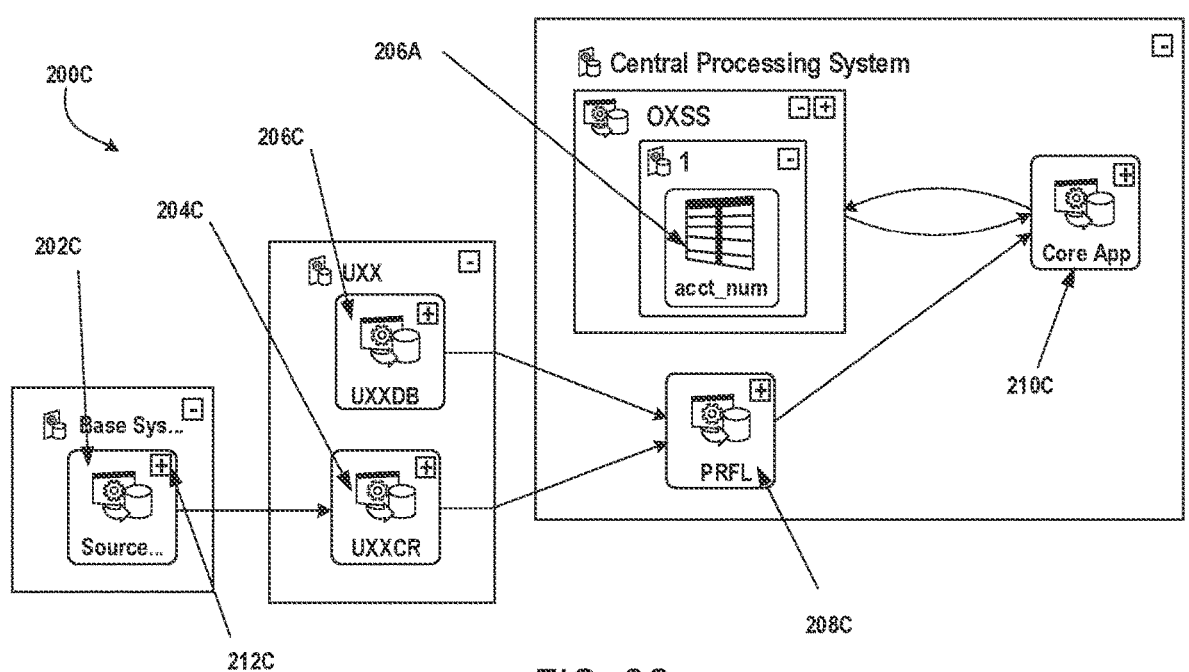

In FIG. 2C, a corresponding lineage diagram 200C for target element 206A is shown, but the level of resolution is set to applications that are participating in the calculation for the target data element 206A. Specifically, applications 202C, 204C, 206C, 208C, and 210C are shown, as only those applications directly participate in the calculation for the target data element 206A. If a user wishes to view any part of the lineage diagram in a different level of resolution (e.g., to display more or less detail in the diagram), the user may activate the corresponding expand/collapse button 212C.

Figure 2D:
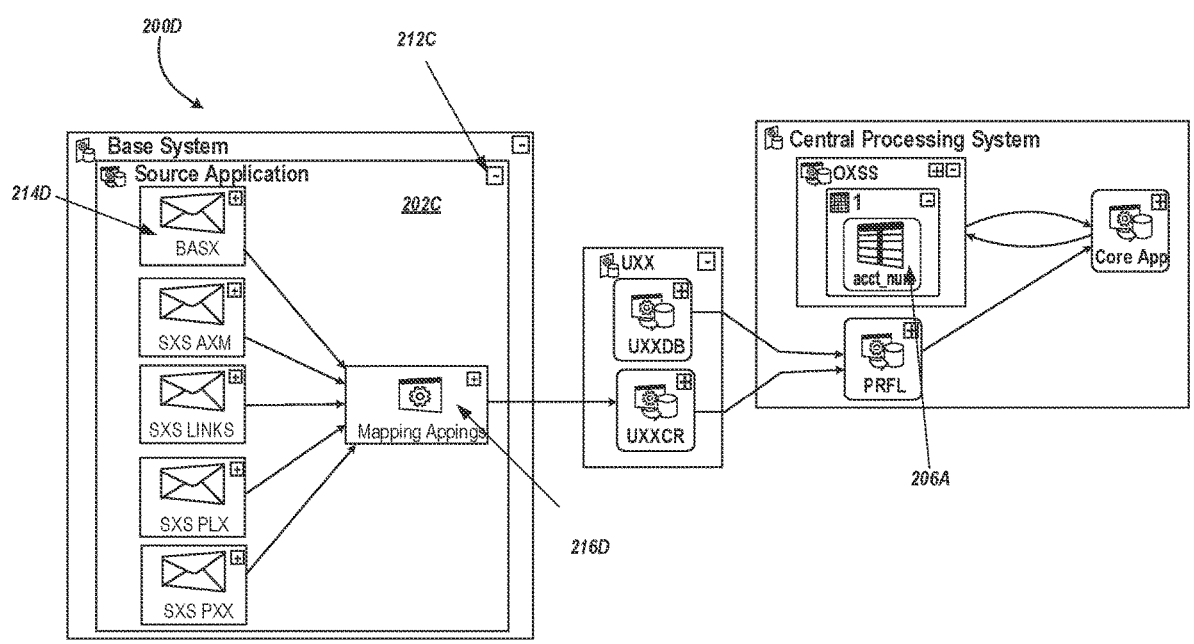

FIG. 2D shows a corresponding lineage diagram 200D at a different level of resolution. In this example, an expand/collapse button 212C has been activated by a user, and the metadata viewing environment now displays the same lineage diagram, but application 202C has been expanded to show the datasets 214D and executables 216D within application 202C.

Figure 2E:
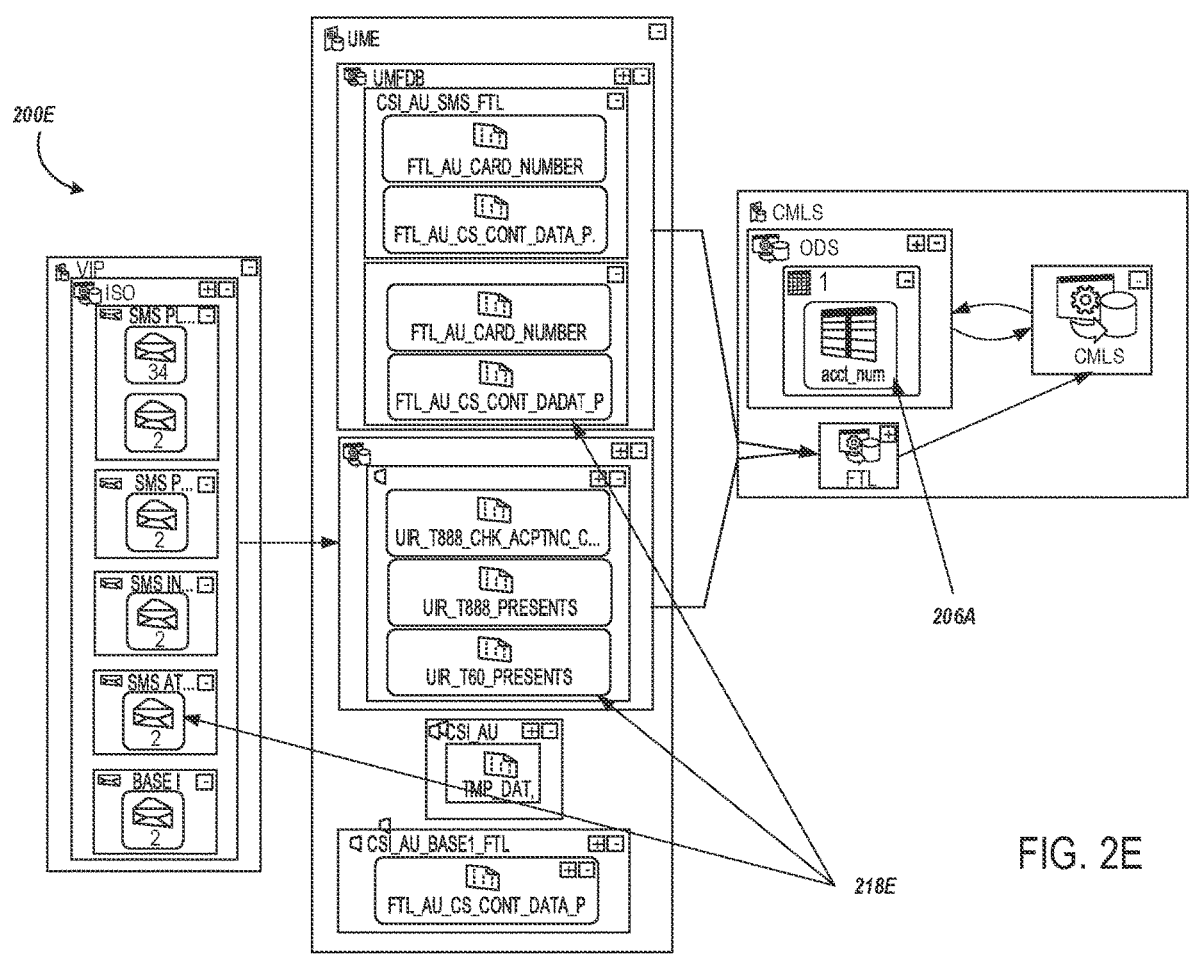

FIG. 2E shows a corresponding lineage diagram 200E at a different level of resolution. In this example, a user has selected to show everything expanded by a custom expansion. Any field or column which is an ultimate source of data (e.g., it has no upstream systems) is expanded. In addition, fields that have a specific flag set are also expanded. In this example, the specific flags are set on datasets and fields at a key intermediate point in the lineage, and one column is the column for which the lineage is being shown.

Other examples of lineage are described in U.S. patent application Ser. No. 12/629,466, titled "VISUALIZING RELATIONSHIPS BETWEEN DATA ELEMENTS AND GRAPHICAL REPRESENTATIONS OF DATA ELEMENT ATTRIBUTES," which is hereby incorporated by reference in its entirety.

Viewing elements and relationships in the metadata viewing environment can be made more useful by adding information relevant to each of the nodes that represent them. One exemplary way to add relevant information to the nodes is to graphically overlay information on top of certain nodes. These graphics may show some value or characteristic of the data represented by the node, and can be any property in the metadata database. This approach has the advantage of combining two or more normally disparate pieces of information (relationships between nodes of data and characteristics of the data represented by the nodes) and endeavors to put useful information "in context." For example, characteristics such as metadata quality, metadata freshness, or source of record information can be displayed in conjunction with a visual representation of relationships between data nodes. While some of this information may be accessible in tabular form, it may be more helpful for a user to view characteristics of the data along with the relationships between different nodes of data. A user can select which characteristic of the data will be shown on top of the data element and/or transformation nodes within the metadata viewing environment. Which characteristic is shown can also be set according to default system settings.

Figure 3:
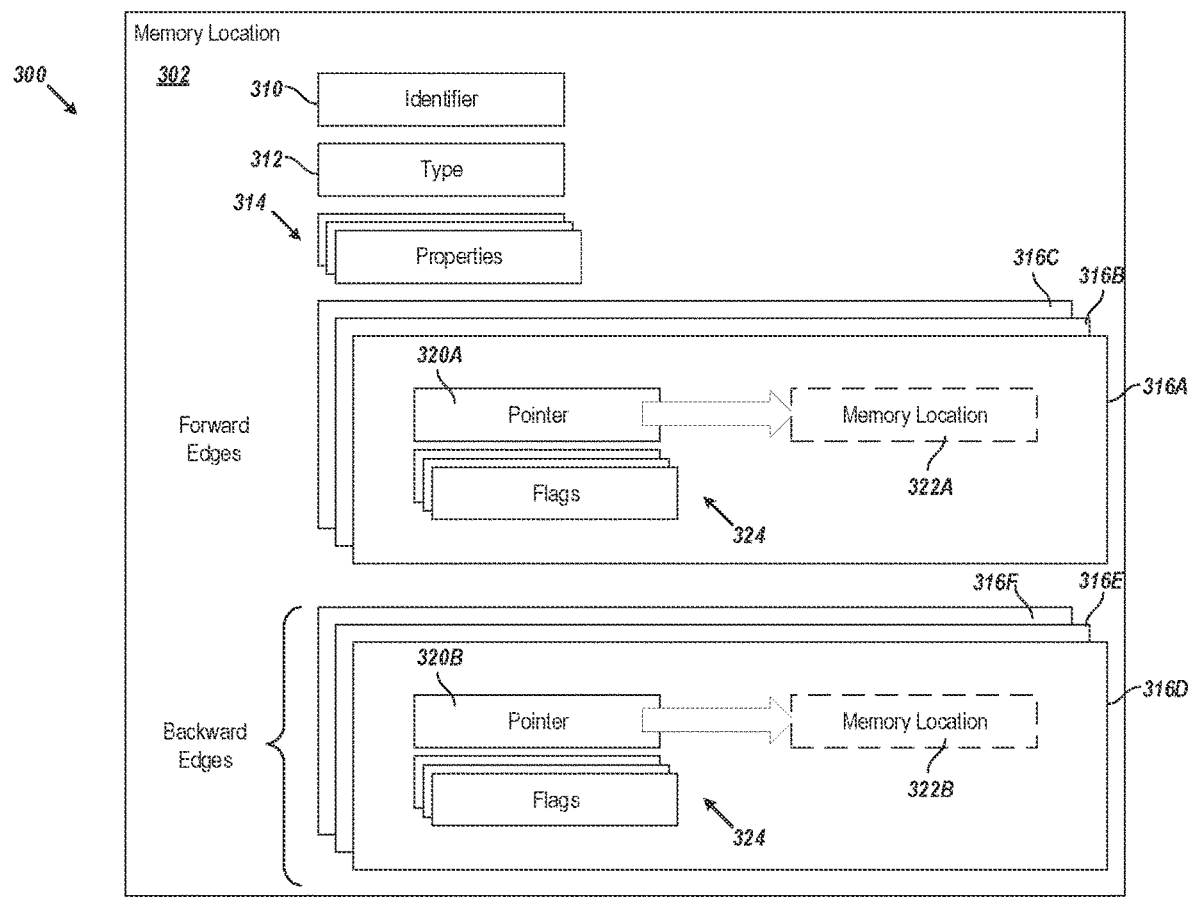
FIG. 3 shows an example data structure.

As described above with respect to FIG. 1A, the lineage server 102 uses data structures 134 to store lineage metadata in memory (e.g., random access memory). FIG. 3 shows an example data structure 300. In use, the lineage server 102 contains many instances of the data structure 300. An instance of a data structure is a collection of data (e.g., collection of bits) formatted in a manner defined by the data structure. An instance of the data structure 300 described here is sometimes referred to as a "node."

Each instance of the data structure 300 represents a metadata object, e.g., one of the data elements 202A or transformations 204A shown in FIG. 2A. In some examples, each instance of the data structure 300 represents a node that may be shown in a lineage diagram, e.g., the diagrams 200A-200E shown in FIGS. 2A-2E.

In use, the lineage server 102 stores each data structure 300 at a memory location 302 specific to the data structure. Each data structure 300 typically points to memory locations of other data structures.

The data structure 300 is made up of several fields. A field is a collection of data, e.g., a subset of the bits that make up an instance of the data structure 300. An identifier field 310 includes data representing a unique identifier for an instance of the data structure 300. A type field 312 includes data representing a type of a metadata object represented by the corresponding instance of the data structure 300. In some examples, the type could be "data element," "transformation," and so on. In some examples, the type field 312 also indicates how many forward and backward edges are included in the instance of the data structure 300. Properties fields 314 each represent different characteristics of the metadata object represented by the corresponding instance of the data structure 300. Examples of the properties fields 314 can include a "name" field that includes a text label identifying the metadata object, and a "subtype" field that indicates a subtype of the metadata object, e.g., whether the metadata object represents a file object, executable object, a database object, or another subtype. Other types of properties can be used. In general, the type field 312 and properties fields 314 can be customized for a particular instance of the lineage server 102, and are not confined to the examples listed here.

The data structure also includes fields that represent forward edges 316A-C and backward edges 316D-F. The edge fields 316A-F enable the lineage server 102 to "walk" from data structure to data structure and collect the data of the data structure when gathering lineage metadata. In the broadest sense, when we refer to "collecting" a portion data, we mean identifying the portion of data as pertinent to a future action (e.g., transmitting the collected data). Collecting a portion of data sometimes includes copying the data, e.g., copying the data to a buffer or queue to be used in the future action.

Each edge field 316A-F includes a pointer field 320A-B. The pointer field 320A-B stores an address of a respective memory location 322A-B. In general, a memory location 322A-B referenced by a pointer field 320A-B refers to a portion of memory that stores another instance of the data structure 300. In this way, one instance of a data structure representing a metadata object is "linked" to one or more other instances of data structures representing other metadata objects. Thus, the edges 316A-D can correspond to, e.g., the relationships among the metadata objects shown in the lineage diagram examples 200A-E of FIGS. 2A-2E. For example, a forward edge 316A represents an effect that a metadata object (e.g., the metadata object represented by this instance of the data structure 300) has on another metadata object (e.g., the metadata object represented by the instance of the data structure at the memory location 322A). As another example, a backward edge 316D represents an effect that another metadata object (e.g, the metadata object represented by the instance of the data structure at the memory location 322B) has on the metadata object of this instance of the data structure 300.

Each edge field 316A-F also includes one or more flags 324. The flags 324 are indicators of information about their associated edge. In some examples, one of the flags 324 may indicate a type of the associated edge, selected from multiple possible types. Many types of edges are possible. For example, some types of edges are input/output edges (representing output from one object and input to another object), element/dataset edges (representing an association between an element and the dataset to which the element belongs), and application/parent edges (representing an association between an executable application and a container, such as a container that also contains datasets associated with the application).

Many of the elements of the data structure 300 typically use a relatively small amount of data. For example, the data associated with the identifier field 310, type field 312, and properties fields 314 together may only be a few bytes. e.g., 32 bytes. These fields encode commonly used information within as little as a few bits; for example, if there are only eight possible types for a node, the type field 312 can be as little as three bits long. More complex data, such as strings of text representing the node types, need not be used. Further, the data associated with the memory location 322A-C is typically the same amount of data as the length of a memory address associated with the type of computer system executing software that instantiates the data structure 300. Thus, most or all instances of a data structure 300 may use a relatively small amount of data in total, compared to the data used by other techniques for storing lineage metadata.

Figure 4:
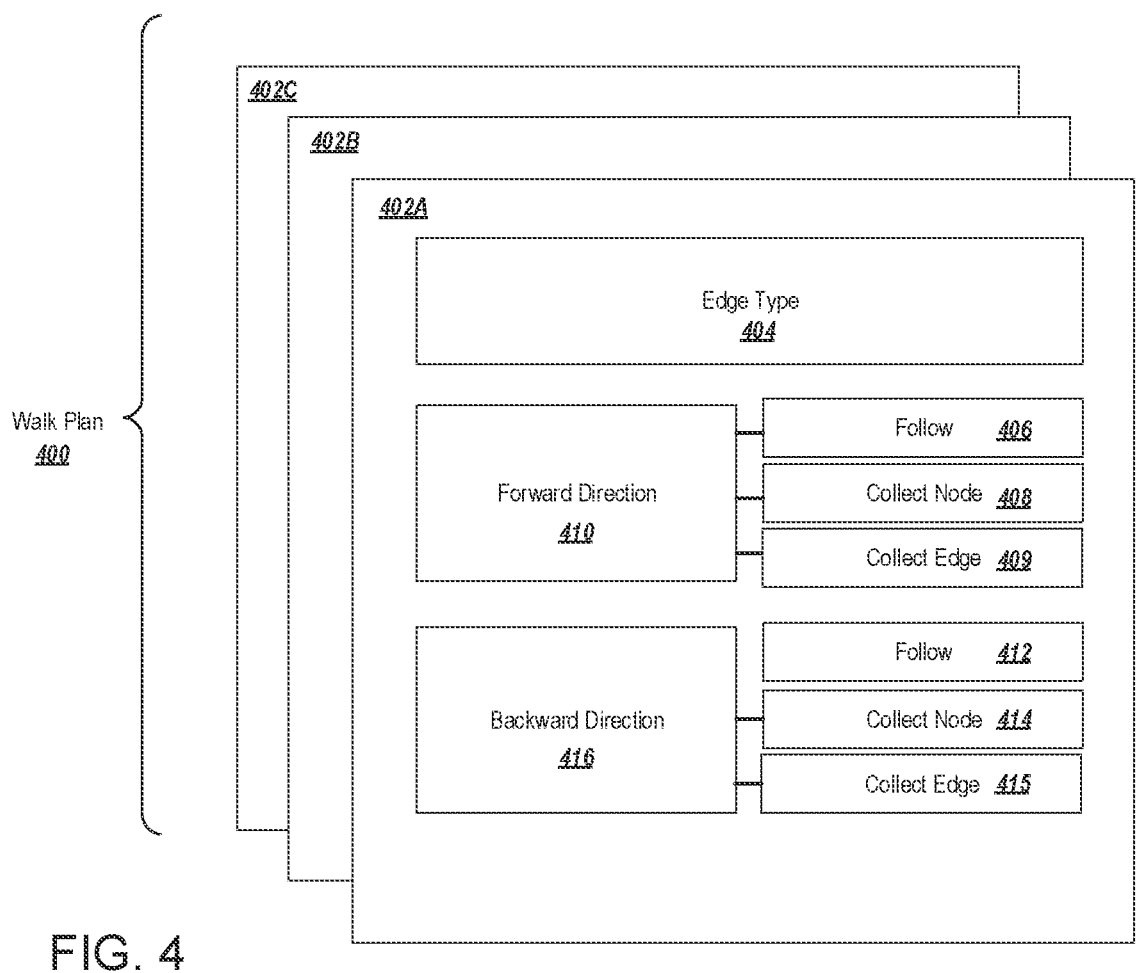
FIG. 4 shows an example walk plan.

FIG. 4 shows an example of a walk plan 400. As described above with respect to FIG. 1C, walk plans 400 are typically stored by the metadata server 104. In use, the metadata server 104 provides a walk plan to the lineage server 102 when requesting lineage metadata.

A walk plan 400 describes information used by the lineage server 102 when traversing its stored data structures 134. In general, when a query for lineage metadata is received, e.g., lineage metadata pertinent to a particular metadata object, not all types of lineage metadata need to be returned in response. In some examples, depending on the query, lineage metadata associated with some types of edges may not need to be returned because it is not responsive to the query.

Accordingly, the walk plan 400 includes records 402A-C for each edge type that may be among the types of edges represented by the lineage metadata stored by the lineage server 102. A record 402A includes an edge type field 404 that includes data indicating the type of edge corresponding to the record 402A. A record 402A also includes a follow flag 406, a collect node flag 408, and a collect edge flag 409 for the forward direction 410, and a follow flag 412, a collect node flag 414, and a collect edge flag 415 for the backward direction 416.

A follow flag 406, 412 indicates whether or not the lineage server 102 should follow an edge of this edge type when traversing its data structures 134. Put another way, a follow flag 406 for the forward direction 410 indicates whether or not the lineage server 102, referring to FIG. 3, should access the memory location 322A identified by a pointer field 320A of a forward edge field 316A of an instance of the data structure 300. Similarly, a follow flag 412 for the backward direction 416 indicates whether or not the lineage server 102, referring to FIG. 3, should access the memory location 322b identified by a pointer field 320b of a backward edge field 316D of an instance of the data structure 300.

A collect node flag 408, 414 indicates whether or not the lineage server 102 should collect an instance of the data structure 300 (FIG. 3), sometimes referred to as a "node," pointed to by this edge type when traversing its data structures 134. When we refer to collecting an instance of the data structure 300, we mean that the data of the instances (or nodes) is added to the data that will be returned in response to a query being processed by the lineage server 102 (FIG. 1A) processing the query. Thus, if a node is collected, data associated with the metadata object represented by the instance of the data structure 300 will be among the lineage metadata returned by the lineage server 102.

A collect edge flag 409, 415 indicates whether or not the lineage server 102 should collect the edge (e.g., corresponding to the pointer field 320A of an instance of the data structure 300). If an edge is collected, data representing the edge will be among the lineage metadata returned by the lineage server 102. In some implementations, an edge may not be collected if the edge does not represent a flow of data between the nodes. For example, the edge may represent the association between a data object (represented by one node) and a container of the data object (representing by another node). In this way, by using collect node flags 408, 414 and collect edge flags 409, 415 in a walk plan 400, nodes can be associated with each other in a variety of ways that may or may not be collected for inclusion in lineage metadata, and nodes can represent a variety of data that may or may not be collected for inclusion in lineage metadata.

In some implementations, in use, a walk plan 400 can be represented in the form of one or more XML (Extensible Markup Language) documents. An XML document is a collection of portions separated by "tags." A tag typically contains a label (e.g., a label identifying the type of tag) and may also include one or more attributes. Tags sometimes come in the form of a start tag and an end tag, such that a start tag is paired with a corresponding end tag. In this way, tags can be hierarchical, such that tags are "nested" within other tags, e.g., by placing a tag between another tag's start tag and end tag pair.

An example walk plan in the form of an XML document is presented below:

```
<lineageServerPlan direction="both" conditionalOnArg="!autoFilterEnabled"
replacesQueries="walk">
    <useEdge name="DE-Tr">
        <condition special="ExeInterfaceCallStack" />
        <condition special="ControlFilter" />
        <condition special="Summarization" />
    </useEdge>
    <useEdge name="Tr-DE">
        <condition special="ExeInterfaceCallStack" />
        <condition special="ControlFilter" />
        <condition special="Summarization" />
    </useEdge>
    <useEdge name="DE-DS" direction="forward" collectEdge="false"
conditionalOnArg="walkDSlevel" />
    <useEdge name="Tr-Exe" direction="forward" collectEdge="false"
conditionalOnArg="walkDSlevel" />
    <useEdge name="DS-Exe" conditionalOnArg="walkDSlevel">
        <condition special="ExeInterfaceCallStack" />
        <condition special="DSLevelIfNoDE" />
    </useEdge>
    <useEdge name="Exe-DS" conditionalOnArg="walkDSlevel">
        <condition special="ExeInterfaceCallStack" >
        <condition special="DSLevelIfNoDE" />
    </useEdge>
    <useEdge name="DE-DS" direction="backward" collectEdge="false">
        <condition special="DSLevelIfNoDE" />
    </useEdge>
    <useEdge name="Tr-Exe" direction="backward" collectEdge="false">
        <condition special="DSLevelIfNoDE" >
    </useEdge>
</lineageServerPlan>
```

In this example, the "useEdge" tag specifies information for a given type of edge. Each "useEdge" tag can correspond to a record (e.g., the records 402A-C of the walk plan 400). The "name" attribute specifies the type of edge (e.g., the edge type 404), the "direction" attribute specifies the direction (e.g., forward direction 410 or backward direction 416), the "collectEdge" attribute specifies whether to collect the edge (e.g., the collect flags 408, 414). Other tags can be used. For example, the "condition special" tag shown in the example above is used to specify custom rules that are carried out when an edge of the specified edge type is followed. In some examples, the custom rules may specify conditions to determine if the edge should be followed and/or collected.

Figure 5A:
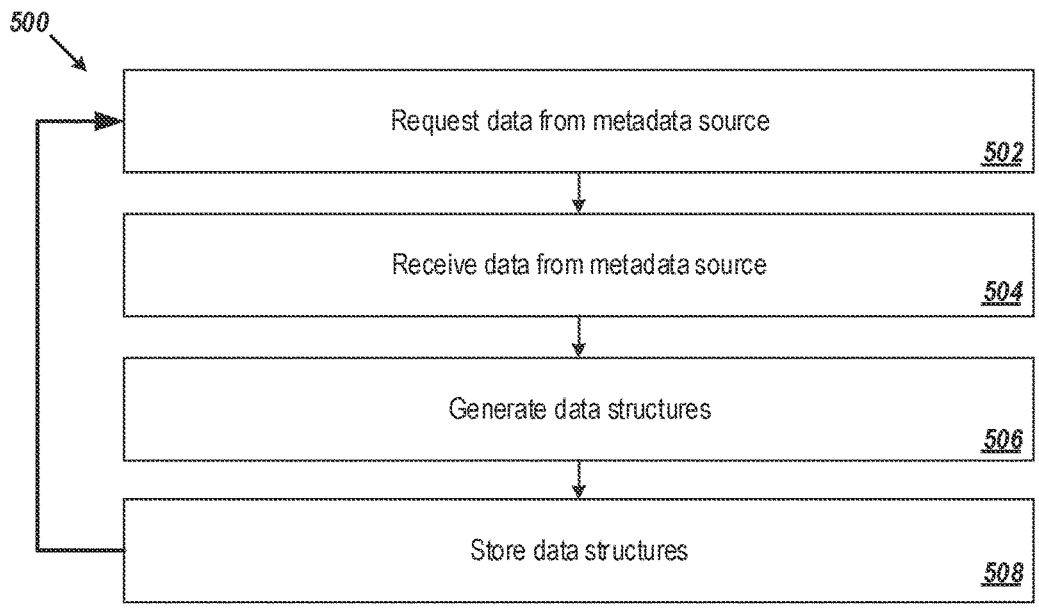
FIG. 5A shows a flowchart representing a procedure for storing lineage metadata in a form defined by a special-purpose data structure.

FIG. 5A shows a flowchart representing a procedure 500 for storing lineage metadata in a form defined by a special-purpose data structure, e.g., the data structure 300 shown in FIG. 3. The procedure 500 can be carried out, for example, by components of the lineage server 102 shown in FIG. 1A.

The procedure requests 502 lineage metadata from a metadata source. For example, the metadata source could be the metadata database 108 shown in FIG. 1A. The request could be a request made on regular or semi-regular intervals, for example, every hour, every ten minutes, every minute, or any other interval. In some examples, the request could be made in response to an event, e.g., an event such as a notification that new metadata is available at the metadata source.

Lineage metadata typically describes nodes and edges, such that each node represents a metadata object, and the edges each represent a one-way effect of one node upon another node, e.g., such that each edge has a single direction.

In some examples, e.g., when a lineage server 102 has not yet generated an initial set of data structures representing lineage metadata, the request is a request for all lineage metadata stored by the data source. In some examples, e.g., when the lineage server 102 is updating an existing set of stored data structures, the request is a request for lineage metadata that has been added or changed since the last request.

The procedure receives 504 data, e.g., lineage metadata, from the metadata source. For example, the lineage metadata can be data representing metadata objects and relationships between the metadata objects.

The procedure generates 506 data structures, e.g., instances of the data structure 300 shown in FIG. 3. For example, the data structures can contain information corresponding to the data received from the metadata source. In some examples, each instance of the data structure corresponds to a respective node received from the metadata source. The data structure can include a field for identification values, e.g., an identification value that identifies the node corresponding to an instance of the data structure. The data structure can also include property fields that represent properties of a node corresponding to an instance of the data structure. The data structure can also pointers to identification values of other nodes, such that the pointers represent edges to the nodes corresponding to the respective identification values.

The procedure stores 508 the data structures. For example, the data structures can be stored in memory, e.g., the memory 135 shown in FIG. 1C. In some examples, the data structures are stored in random access memory. Because the data structures are used to store lineage metadata, any data not relevant to lineage (e.g., other types of metadata stored at the metadata source) can be omitted, reducing the amount of data needed to store the data structures.

In use, the procedure returns to requesting 502 lineage metadata from the metadata source, e.g., on the next regularly scheduled interval.

Figure 5B:
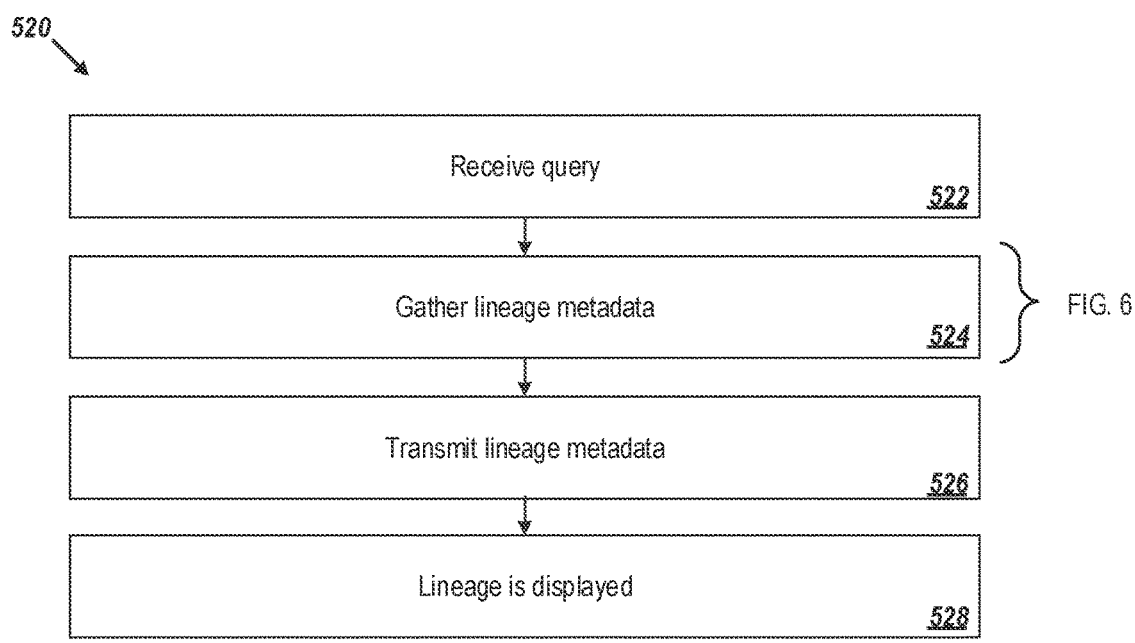
FIG. 5B shows a flowchart representing a procedure for causing lineage metadata to be displayed.

FIG. 5B shows a flowchart representing a procedure 520 for causing lineage metadata to be displayed. The procedure 520 can be carried out, for example, by components of the lineage server 102 shown in FIG. 1A. In general, a lineage server is configured to return a response to a query that includes metadata describing lineage of a particular element of data, e.g., a metadata object. In some examples, the metadata describes a sequence of nodes and edges, wherein one of the nodes of the sequence represents the particular element of data. In some examples, the procedure 520 is used to access lineage metadata stored by the procedure 500 described above with respect to FIG. 5A.

The procedure receives 522 a query, e.g., a query for lineage metadata. In some examples, the query identifies a metadata object for which lineage metadata is requested.

In some implementations, the query includes an identification of a type of lineage and a walk plan that identifies which types of edges are relevant to the identified type of lineage. In some examples, the walk plan includes conditions for following or collecting an edge based on one or more property values representing respective properties of a corresponding node. An example of a walk plan 400 is shown in FIG. 4.

The procedure gathers 524 lineage metadata. For example, a node representing the metadata object of the received query can be accessed and collected, and edges (e.g., pointers to memory locations) can be traversed to collect other nodes. The gathering of lineage metadata is described in further detail below with respect to FIG. 6.

The procedure transmits 526 the gathered lineage metadata. For example, the gathered lineage metadata can be transmitted to a computer system that issued the query.

After the gathered lineage metadata is transmitted, the gathered lineage metadata may be caused to be displayed 528 on a computer system, e.g., the user terminal 116 shown in FIG. 1A. For example, the lineage metadata may be displayed in the form of a lineage diagram such as the lineage diagrams 200A-200E shown in FIG. 2A-2E.

Figure 6:
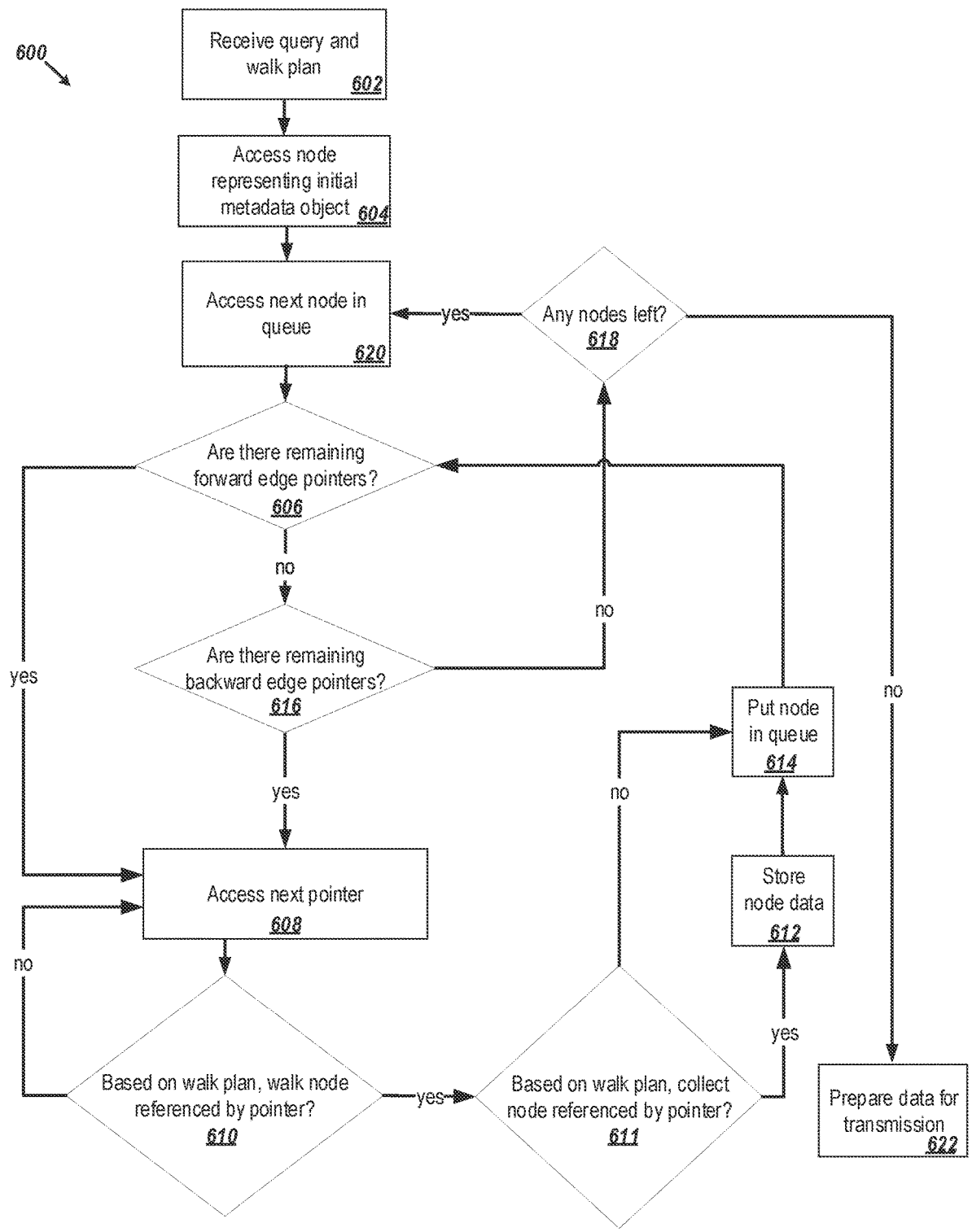
FIG. 6 shows a flowchart representing a procedure for traversing lineage metadata stored in the form of special-purpose data structures.

FIG. 6 shows a flowchart representing a procedure 600 for traversing lineage metadata stored in the form of special-purpose data structures, e.g., instances of the data structure 300 shown in FIG. 3. The procedure 600 can be carried out, for example, by components of the lineage server 102 shown in FIG. 1A.

The procedure receives 602 a query and walk plan, e.g., the query 114 and walk plan 130 shown in FIG. 1C. The procedure accesses 604 accesses an initial node (e.g., instance of the data structure 300 shown in FIG. 3) representing a metadata object referenced by the query 114. For example, the initial node may be identified by an identifier field 310 (FIG. 3) storing data that is associated with the metadata object. The initial node is then used as the "current" node, and a recursive portion of the process begins in which the current node is selected from a queue and operations are applied to the current node. Put another way, the initial node is placed in a queue as the first node of the queue, and other nodes are subsequently added to the queue as the procedure is carried out.

The procedure determines 606 if there are remaining forward edge pointers in the current node (e.g., forward edge pointers that have not yet been accessed). If so, the procedure accesses 608 the next pointer that has yet to be accessed, e.g., accesses the memory location of the pointer to retrieve data stored at that memory location. The procedure determines 610 whether to "walk" (e.g., process) the node at that pointer, e.g., according to the edge type associated with the pointer, based on the walk plan (as described above with respect to FIG. 4). If not, the procedure accesses 608 another pointer. If so, the procedure determines whether to collect 611 the node at that pointer. If so, the procedure stores 612 the data of the node to be returned in response to the query, and then places 614 the node in the queue so that its pointers can be accessed. If not, the procedure only puts the node in the queue.

Once all of the forward edge pointers in the current node have been traversed, the procedure determines 616 if there are remaining backward edge pointers in the current node. If so, the procedure accesses 608 the next backward edge pointer.

If there are no remaining forward edge pointers or backward edge pointers, the procedure determines 618 if any nodes remain in the queue. If so, the procedure accesses 620 the next node in the queue, and carries out operations described above using the next node in the queue as the current node. If no nodes remain, the procedure prepares 622 the collected data for transmission to other system. For example, the collected data may be arranged in a particular format because it is transmitted. As another example, encoded data in the collected data may be decoded. For example, data fields containing an encoded value can be converted to a text string corresponding to the value.

Once the data is prepared for transmission, the data can be transmitted, e.g., as described in FIG. 5B with respect to transmission 526 of data.

The systems and techniques described herein can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method performed by a data processing system for updating data structures with lineage from a database, wherein updating provides for increased efficiency in determining lineage, including:

storing, in memory of a data processing system, a first data structure representing a first item of data or a first transform;

wherein the first data structure specifies lineage of a given item of data or a given transform, wherein the lineage specifies an item of data or a transform that affects or is affected by the given item of data or the given transform; and updating, by a data processing system, the lineage specified by the first data structure, by:

from time to time, receiving, from a database and by a data processing system, data representing lineage of the given item of data or the given transform;

based on the received data representing the lineage, identifying, by a data processing system, a second data structure, stored in memory, representing a second item of data or a second transform that affects or is affected by the given item of data or the given transform; and updating, by a data processing system, the first data structure stored in memory with a reference to the second data structure, stored in memory, representing the second item of data or the second transform that affects or is affected by the given data item or the given transform;

wherein the second data structure specifies lineage of the second item of data or the second transform.

2. The method of claim 1, wherein updating the first data structure comprises updating a pointer of the first data structure to reference a memory location of the second data structure representing the second item of data or the second transform.

3. The method of claim 1, further comprising
generating a third data structure specifying lineage of the second item of data or the second transform; and
storing, in the memory of the data processing system, the third data structure.

4. The method of claim 1, further comprising receiving, from the database, the data representing lineage of the given item of data or the given transform at regular intervals or scheduled intervals.

5. The method of claim 1, wherein the data representing lineage of the given item of data or the given transform is received in response to a request transmitted to the database.

6. The method of claim 1, further comprising:
receiving a query including a request for lineage;
based on the query, accessing the first data structure and a third data structure to determine the requested lineage; and
generating a response to the query, the response including data representing the requested lineage.

7. The method of claim 6, further comprising:
accessing a walk plan that includes instructions for determining the requested lineage; and
collecting data from the first data structure and third data structure according to the walk plan to determine the requested lineage.

8. The method of claim 1, wherein the given item of data or the given transform is the first item of data or the first transform.

9. A system for updating data structures with lineage from a database, wherein updating provides for increased efficiency in determining lineage, the system comprising:
at least one processor; and
at least one computer-readable medium storing instructions executable by the at least one processor to perform operations comprising:
storing, in memory, a first data structure representing a first item of data or a first transform;
wherein the first data structure specifies lineage of a given item of data or a given transform, wherein the lineage specifies an item of data or a transform that affects or is affected by the given item of data or the given transform; and
updating the lineage specified by the first data structure, by:
from time to time, receiving, from a database, data representing lineage of the given item of data or the given transform;
based on the received data representing the lineage, identifying a second data structure, stored in memory, representing a second item of data or a second transform that affects or is affected by the given item of data or the given transform; and
updating the first data structure stored in memory with a reference to the second data structure, stored in memory, representing the second item of data or the second transform that affects or is affected by the given data item or the given transform;
wherein the second data structure specifies lineage of the second item of data or the second transform.

10. The system of claim 9, wherein updating the first data structure comprises updating a pointer of the first data structure to reference a memory location of the second data structure representing the second item of data or the second transform.

11. The system of claim 9, wherein the at least one computer readable medium stores instructions executable by the at least one processor to perform operations further comprising:
generating a third data structure specifying lineage of the second item of data or the second transform; and
storing, in the memory, the third data structure.

12. The system of claim 9, wherein the at least one computer readable medium stores instructions executable by the at least one processor to perform operations further comprising:
receiving, from the database, the data representing lineage of the given item of data or the given transform at regular intervals or scheduled intervals.

13. The system of claim 9, wherein the data representing lineage of the given item of data or the given transform is received in response to a request transmitted to the database.

14. The system of claim 9, wherein the at least one computer readable medium stores instructions executable by the at least one processor to perform operations further comprising:
receiving a query including a request for lineage;
based on the query, accessing the first data structure and a third data structure to determine the requested lineage; and
generating a response to the query, the response including data representing the requested lineage.

15. The system of claim 14, wherein the at least one computer readable medium stores instructions executable by the at least one processor to perform operations further comprising:
accessing a walk plan that includes instructions for determining the requested lineage; and
collecting data from the first data structure and the third data structure according to the walk plan to determine the requested lineage.

16. At least one non-transitory computer readable medium storing instructions executable by at least one processor to perform operations comprising:
storing, in memory, a first data structure representing a first item of data or a first transform;
wherein the first data structure specifies lineage of a given item of data or a given transform, wherein the lineage specifies an item of data or a transform that affects or is affected by the given item of data or the given transform; and
updating the lineage specified by the first data structure, by:
from time to time, receiving, from a database, data representing lineage of the given item of data or the given transform;
based on the received data representing the lineage, identifying a second data structure, stored in memory, representing a second item of data or a second transform that affects or is affected by the given item of data or the given transform; and
updating the first data structure stored in memory with a reference to the second data structure, stored in memory, representing the second item of data or the second transform that affects or is affected by the given data item or the given transform;
wherein the second data structure specifies lineage of the second item of data or the second transform.

17. The at least one non-transitory computer readable medium of claim 16, wherein updating the first data structure comprises updating a pointer of the first data structure to reference a memory location of the second data structure representing the second item of data or the second transform.

18. The at least one non-transitory computer readable medium of claim 16 storing instructions executable by the at least one processor to perform operations further comprising:

generating a third data structure specifying lineage of the second item of data or the second transform; and storing, in the memory, the third data structure.

19. The at least one non-transitory computer readable medium of claim 16 storing instructions executable by the at least one processor to perform operations further comprising:

receiving, from the database, the data representing lineage of the given item of data or the given transform at regular intervals or scheduled intervals.

20. The at least one non-transitory computer readable medium of claim 16, wherein the data representing lineage of the given item of data or the given transform is received in response to a request transmitted to the database.

21. The at least one non-transitory computer readable medium of claim 16 storing instructions executable by the at least one processor to perform operations further comprising:

receiving a query including a request for lineage;

based on the query, accessing the first data structure and a third data structure to determine the requested lineage; and generating a response to the query, the response including data representing the requested lineage.

* * * * *

UNITED STATES PATENT AND TRADEMARK OFFICE
CERTIFICATE OF CORRECTION

| | | |
|---|---|---|
| PATENT NO. | : 12,405,949 B2 | Page 1 of 1 |
| APPLICATION NO. | : 18/345706 | |
| DATED | : September 2, 2025 | |
| INVENTOR(S) | : David Clemens, Dusan Radivojevic and Neil Galarneau | |

It is certified that error appears in the above-identified patent and that said Letters Patent is hereby corrected as shown below:

In the Claims

Column 17, Line 27, Claim 7, after "and", insert -- the --

Signed and Sealed this
Twenty-first Day of October, 2025

John A. Squires
*Director of the United States Patent and Trademark Office*